(12) United States Patent
Ikeda

(10) Patent No.: US 8,939,757 B2
(45) Date of Patent: Jan. 27, 2015

(54) LIQUID RESIN MOLDING SYSTEM

(71) Applicant: Nissei Plastic Industrial Co., Ltd., Nagano (JP)

(72) Inventor: Toru Ikeda, Nagano (JP)

(73) Assignee: Nissei Plastic Industrial Co., Ltd. (JP)

( * ) Notice: Subject to any disclaimer, the term of this patent is extended or adjusted under 35 U.S.C. 154(b) by 0 days.

(21) Appl. No.: 13/873,347

(22) Filed: Apr. 30, 2013

(65) Prior Publication Data

US 2013/0302468 A1    Nov. 14, 2013

(30) Foreign Application Priority Data

May 8, 2012    (JP) ................ 2012-106979

(51) Int. Cl.
| | | |
|---|---|---|
| B21C 45/00 | (2006.01) | |
| B29C 45/07 | (2006.01) | |
| B29C 45/23 | (2006.01) | |
| B29C 45/32 | (2006.01) | |
| B29C 45/04 | (2006.01) | |
| B29C 67/24 | (2006.01) | |
| B29K 83/00 | (2006.01) | |
| B29C 45/17 | (2006.01) | |
| B29C 45/42 | (2006.01) | |

(52) U.S. Cl.
CPC ............ *B29C 45/076* (2013.01); *B29C 45/231* (2013.01); *B29C 45/32* (2013.01); *B29C 45/322* (2013.01); *B29C 45/0416* (2013.01); *B29C 67/246* (2013.01); *B29K 2083/005* (2013.01); *B29C 45/1761* (2013.01); *B29C 45/42* (2013.01)
USPC ........................................ 425/574

(58) Field of Classification Search
CPC .. B29C 45/075; B29C 45/0416; B29C 45/32; B29C 45/322; B29C 45/231; B29C 45/1761; B29C 45/42
USPC .......................................... 425/574
See application file for complete search history.

(56) References Cited

U.S. PATENT DOCUMENTS

| | | | | |
|---|---|---|---|---|
| 4,106,887 | A * | 8/1978 | Yasuike et al. ............ | 425/549 |
| 2006/0127521 | A1 * | 6/2006 | Toshio et al. ............. | 425/146 |
| 2006/0240140 | A1 * | 10/2006 | Banjo et al. ............. | 425/450.1 |
| 2010/0019411 | A1 * | 1/2010 | Fukumoto et al. ........ | 264/299 |

FOREIGN PATENT DOCUMENTS

| | | |
|---|---|---|
| JP | 46 26300 | 9/1971 |
| JP | 57141022 | 3/1982 |
| JP | 06122131 | 6/1994 |

OTHER PUBLICATIONS

Notification of Reasons for Refusal mailed Mar. 18, 2014 issued in Japanese Patent Appln. No. P2012-106979 together with partial English-language translation.

* cited by examiner

*Primary Examiner* — Jacob Thomas Minskey
(74) *Attorney, Agent, or Firm* — Adams & Wilks

(57) ABSTRACT

A liquid resin molding system has a stationary platen and a movable platen mounted for undergoing movement relative to the stationary platen. A mold has at least one cavity and includes a first mold member attached to the movable platen and a second mold member attached to the stationary platen. An injection nozzle is attached to the movable platen and is configured to receive a liquid resin and to inject the liquid resin into the mold cavity. A nozzle touch mechanism is attached to the movable platen for pressing the injection nozzle against the mold.

15 Claims, 13 Drawing Sheets

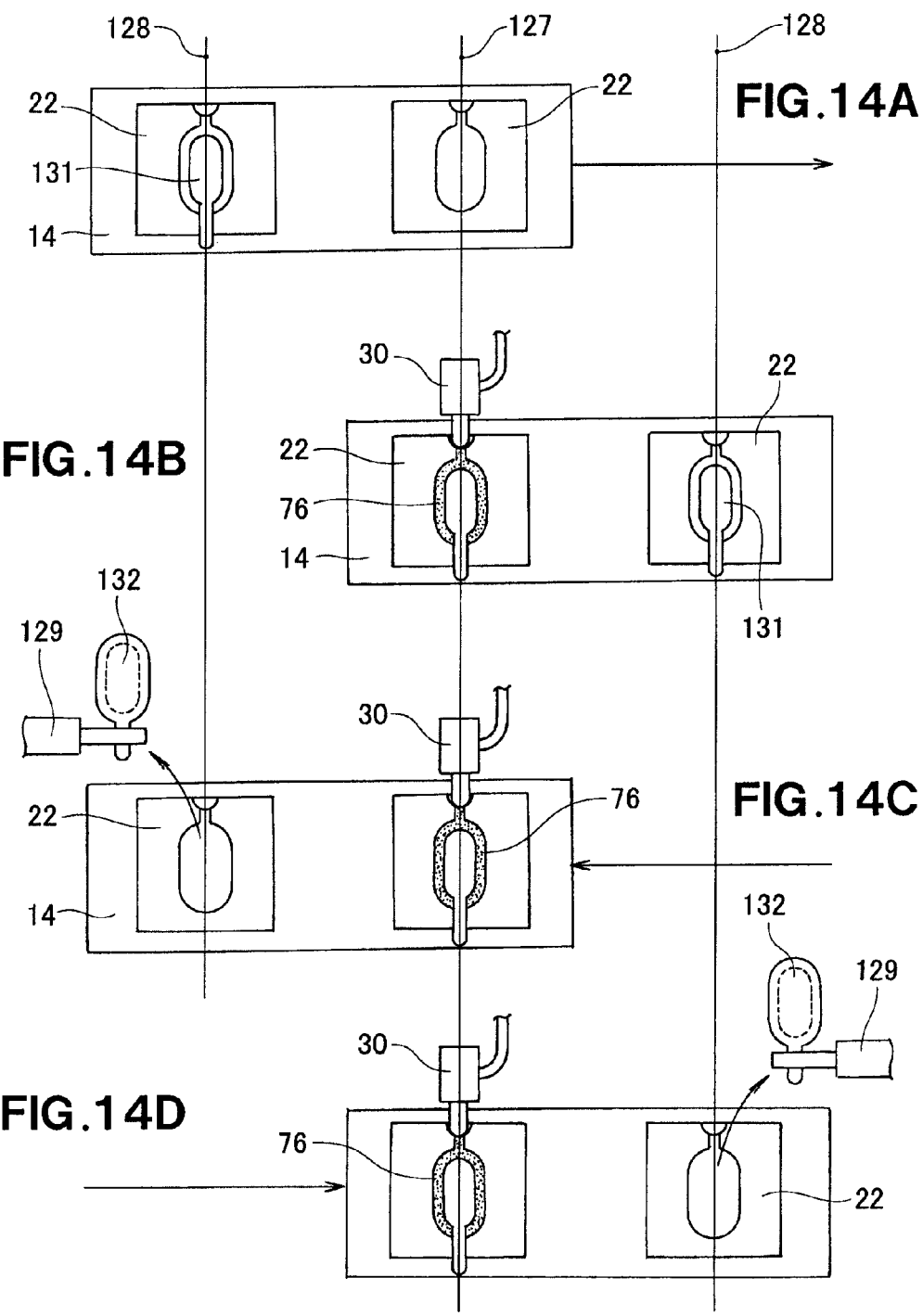

LIQUID RESIN MOLDING SYSTEM

FIELD OF THE INVENTION

The present invention relates to an improvement in a liquid resin molding system.

BACKGROUND OF THE INVENTION

In many of injection molding apparatuses, a mold is closed by moving in the same direction as an axial direction of an injection unit. In contrast to such injection molding apparatuses, some injection molding apparatus has a mold arranged to be closed by moving in a direction perpendicular to an axis of an injection unit, as disclosed in JP-U-46-26300.

FIGS. 15A and 15B hereof schematically show a well-known injection molding apparatus 200 disclosed in JP-U-46-26300. As shown in FIG. 15A, the injection molding apparatus 200 includes a base 201, an injection unit 202 disposed horizontally on the base 201, and a mold clamping mechanism 203 vertically movably disposed on the base 201.

In the mold clamping mechanism 203, a mold assembly 207 is shown in a closed position where a first cavity 208 is formed between an upper mold 204 and an middle mold 205 and a second cavity 209 is formed between the middle mold 205 and a lower mold 206.

Referring to FIG. 15A, the injection unit 202 injects a molten resin into the first cavity 208 after which a high-pressure oil is fed to a hydraulic cylinder 211 to elevate the mold clamping mechanism 203 in its entirety.

When the mold clamping mechanism 203 is elevated to a predetermined height, the injection unit 202 injects a resin material into the second cavity 209, as shown in FIG. 15B.

Since two molded products can be obtained using the single injection unit 202, productivity of the injection molding apparatus 200 is improved.

The mold assembly 207 gradually expands due to heat of the molten resin. This expansion of the mold assembly 207 changes heights of first and second sprues 212, 213. This results in each of central axes of the first sprues 212, 213 being vertically displaced out of alignment with a central axis of the injection unit 202 during injection of molten resin. If this vertical displacement is large, undesirable leakage of molten resin is likely to occur.

As for the injection molding apparatus 200 having the mold arranged to be closed by moving in the direction perpendicular to an axis of the injection unit 202, the injection unit 202 disposed on the base 201 does not move vertically whereas the sprues 212, 213 are vertically displaced in a direction parallel to a direction in which the mold moves when the mold is closed. As a result, leakage of molten resin is likely to occur around the sprues. Measures should be taken to address the leakage of the molten resin.

SUMMARY OF THE INVENTION

An object of the present invention is to provide an injection molding system having a mold arranged to be closed by moving in a direction perpendicular to an axis of an injection unit such that no molten resin leaks from sprues.

According to one aspect of the present invention, there is provided a liquid resin molding system comprising: a vertical mold clamping mechanism including a stationary platen, a movable platen movable relative to the stationary platen, and mold clamping drive means for moving the movable platen vertically; a mold to be closed by the vertical mold clamping mechanism, the mold including a first mold member attached to the movable platen and a second mold member attached to the stationary platen; an injection nozzle for injecting a liquid resin into a cavity defined within the mold; a nozzle touch mechanism for pressing the injection nozzle against the mold; a liquid resin feeding apparatus disposed separately from the injection nozzle for feeding the liquid resin to the injection nozzle, wherein the injection nozzle and the nozzle touch mechanism are attached to the movable platen.

The injection nozzle and the nozzle touch mechanism are attached to the movable platen. The injection nozzle and the first mold member move together with the movable platen. The position of one of the first mold member and the injection nozzle relative to the other remains unchanged, and thus resin leakage is not likely to occur.

It is not readily possible to attach a prior art injection unit to the movable platen. This is because a heating cylinder for plastication and measurement is heavy. In this regard, in the present invention, the injection nozzle is disposed separately from the liquid resin feeding apparatus. The injection nozzle is small in size and weight. The nozzle touch mechanism for moving the injection nozzle of small size and weight is small in size and weight, too. The small size and weight of the injection nozzle and nozzle touch mechanism can be easily attached to the movable platen.

Preferably, the system further comprises a nozzle opening/closing mechanism built in the injection nozzle for closing the injection nozzle when a pressure of the liquid resin fed to the injection nozzle is equal to or less than a predetermined value, and opening the injection nozzle when the pressure exceeds the predetermined value.

Since the nozzle opening/closing mechanism is built in the injection nozzle, it becomes possible to prevent leakage of a liquid resin having a high fluidity. In addition, the surroundings of the movable platen can be made smaller in size than those if a cylinder unit for opening/closing the injection nozzle were disposed outside or away from the injection nozzle.

In a preferred form of the invention, the liquid resin is made of a main agent and an additive added to the main agent, and wherein the liquid resin feeding apparatus comprises: a stirring/mixing mechanism for stirring the liquid resin to mix the main agent and the additive together; a pump mechanism for pumping the stirred liquid resin made of the main agent and the additive mixed with the main agent; and a volumetric feeding mechanism for measuring an quantity of the liquid resin pumped from the pump mechanism and intermittently feeding a predetermined quantity of liquid resin to the injection nozzle.

By virtue of the stirring/mixing mechanism, the liquid resin can be sufficiently stirred to form a mixture of the main agent and the additive. As a result, it becomes possible to remove a problem of insufficient mixing of the main agent and the additive. Preferably, the additive is a curing agent.

In a further preferred form of the invention, the system further comprises: a first flow passageway interconnecting the pump mechanism and the volumetric feeding mechanism; a second flow passageway interconnecting the volumetric feeding mechanism and the injection nozzle, wherein the volumetric feeding mechanism comprises: a body including a pot portion for storing the liquid resin pumped through the first flow passageway from the pump mechanism, an inlet port connected to the first flow passageway for introducing the liquid resin into the pot portion, and an outlet port connected to the second flow passageway for discharging the liquid resin out of the pot portion; a plunger movably attached to the body; a plunger pushing means provided on the body for pushing the plunger toward an advanced position; an ingress valve disposed on the first flow passageway for moving between an open position to open the first flow passageway and a closed position to close the first flow passageway; and an egress valve disposed on the second flow passageway for moving between an open position to open the second flow passageway and a closed position to close the second flow passageway.

The inlet port may be offset from the outlet port toward the plunger pushing means in an axial direction of the plunger. The plunger may have flow passages configured to direct a liquid resin from the inlet port to a leading end of the plunger even when the plunger is in the most advanced position.

Part of the liquid resin tends to remain in the inlet port. Such a remaining liquid resin would harden and the hardened liquid resin should be cleared away.

To address a problem with this remaining liquid resin, in the present invention, the flow passages is formed on the plunger so as to forcibly guide a liquid resin near the inlet port to the pot portion. As a result, there is no concern that a liquid resin remains near the inlet port without flowing to the pot portion.

By virtue of the volumetric feeding mechanism, the liquid resin with the main agent and the additive mixed with the main agent can be fed via the injection nozzle to the mold. This removes necessity for an injection unit.

Preferably, the system further comprises a slide mechanism for allowing the stationary platen to horizontally slide on the slide mechanism in such a manner as to shuttle between a molding position in which a molded product is formed from the liquid resin and a removing position in which the molded product is removed from the second mold member.

Since the molding position is separate from the removing position, removal of the molded product can be facilitated to thereby enhance productivity.

In a preferred form of the invention, the system further comprises a removing mechanism disposed in the removing position for setting an insert on the second mold member and removing an insert-molded product from the second mold member.

Since the removing mechanism such as a robot is positioned in the removing position, the setting of the insert and the removal of the molded product can be automated.

In a preferred form of the invention, the second mold member is provided in two, the stationary platen carrying the two second mold members thereon, and wherein the removing position is provided in two, each of the two removing positions being located on each of opposite sides of the molding position.

Since the molding position is separate from the two removing positions, removal of the molded product can be facilitated to thereby enhance productivity.

In addition, since the two second mold members are carried on the slidable stationary platen, productivity can be doubled in spite of use of the single first mold member and the single injection nozzle if operating rates of the first mold member and the injection nozzle are doubled.

In a further preferred form of the invention, the system further comprises a removing mechanism disposed in each of the removing positions for setting an insert on each of the two second mold members and removing an insert-molded product from each of the two second mold members.

Since the removing mechanism such as a robot is positioned in each of the two removing positions, the setting of the insert and the removal of the molded product can be automated.

According to a second aspect of the present invention, there is provided a liquid resin molding system comprising: a vertical mold clamping mechanism including a stationary platen, a movable platen movable relative to the stationary platen, and mold clamping drive means for moving the movable platen vertically; a mold to be closed by the vertical mold clamping mechanism, the mold including a first mold member attached to the movable platen, a second mold member attached to the stationary platen and a third mold member to be sandwiched between the first mold member and the second mold member; a first injection nozzle for injecting a liquid resin into a first cavity defined between the first mold member and the third mold member; a first nozzle touch mechanism for pressing the first injection nozzle against the mold; a first liquid resin feeding apparatus disposed separately from the first injection nozzle for feeding the liquid resin to the first injection nozzle; a second injection nozzle for injecting a liquid resin into a second cavity defined between the second mold member and the third mold member; a second nozzle touch mechanism for pressing the second injection nozzle against the mold; a second liquid resin feeding apparatus disposed separately from the second injection nozzle for feeding the liquid resin to the second injection nozzle, wherein the first injection nozzle and the first nozzle touch mechanism are attached to the movable platen, and wherein the second injection nozzle and the second nozzle touch mechanism are attached to the stationary platen.

The first injection nozzle and the first nozzle touch mechanism are attached to the movable platen. The first injection nozzle and the first mold member move together with the movable platen. The position of one of the first mold member and the first injection nozzle relative to the other remains unchanged, and thus resin leakage is not likely to occur.

The second injection nozzle and the second nozzle touch mechanism are attached to the stationary platen and the position of one of the third mold member and the second injection nozzle relative to the other remains unchanged, and thus resin leakage is not likely to occur.

Preferably, the system further comprises nozzle opening/closing mechanisms built in the first and second injection nozzles for closing the first and second injection nozzles when a pressure of the liquid resin fed to each of the first and second injection nozzles is equal to or less than a predetermined value, and opening the first and second injection nozzles when the pressure exceeds the predetermined value.

Since the nozzle opening/closing mechanism is built in each injection nozzle, it becomes possible to prevent leakage of a liquid resin having a high fluidity. In addition, the surroundings of the movable platen can be made smaller in size than those if a cylinder unit for opening/closing the injection nozzle were disposed outside or away from the injection nozzle.

In a preferred form of the invention, the liquid resin is made of a main agent and an additive added to the main agent, and wherein each of the first and second liquid resin feeding apparatuses comprises: a stirring/mixing mechanism for stirring the liquid resin to mix the main agent and the additive together; a pump mechanism for pumping the stirred liquid resin made of the main agent and the additive mixed with the main agent; and a volumetric feeding mechanism for measuring an quantity of the liquid resin pumped from the pump mechanism and intermittently feeding a predetermined quantity of liquid resin to each of the first and second injection nozzles.

By virtue of the stirring/mixing mechanism, the liquid resin can be sufficiently stirred to form a mixture of the main agent and the additive. As a result, it becomes possible to remove a problem of insufficient mixing of the main agent and the additive. Preferably, the additive is a curing agent.

In a further preferred form of the invention, the system further comprises: a first flow passageway interconnecting the pump mechanism and the volumetric feeding mechanism; a second flow passageway interconnecting the volumetric feeding mechanism and each of the first and second injection nozzles, wherein the volumetric feeding mechanism comprises: a body including a pot portion for storing the liquid resin pumped through the first flow passageway from the pump mechanism, an inlet port connected to the first flow passageway for introducing the liquid resin into the pot portion, and an outlet port connected to the second flow passageway for discharging the liquid resin out of the pot portion; a plunger movably attached to the body; a plunger pushing means provided on the body for pushing the plunger toward an advanced position; an ingress valve disposed on the first flow passageway for moving between an open position to open the first flow passageway and a closed position to close the first flow passageway; and an egress valve disposed on the second flow passageway for movement between an open position to open the second flow passageway and a closed position to close the second flow passageway.

The inlet port may be offset from the outlet port toward the plunger pushing means in an axial direction of the plunger. The plunger may have flow passages configured to direct a liquid resin from the inlet port to a leading end of the plunger even when the plunger is in the most advanced position.

Part of the liquid resin tends to remain in the inlet port. Such a remaining liquid resin would harden and the hardened liquid resin should be cleared away.

To address a problem with this remaining liquid resin, in the present invention, the flow passages is formed on the plunger so as to forcibly guide a liquid resin near the inlet port to the pot portion. As a result, there is no concern that a liquid resin remains near the inlet port without flowing to the pot portion.

By virtue of the volumetric feeding mechanism, the liquid resin with the main agent and the additive mixed with the main agent can be fed via each injection nozzle to the mold. This removes the necessity for an injection unit.

BRIEF DESCRIPTION OF THE DRAWINGS

Certain preferred embodiments of the present invention will hereinafter be described in detail, by way of example only, with reference to the accompanying drawings, in which:

FIGS. 14A to 14D show how the further modified liquid resin molding system operates.

DETAILED DESCRIPTION OF THE PREFERRED EMBODIMENTS

Figure 1:
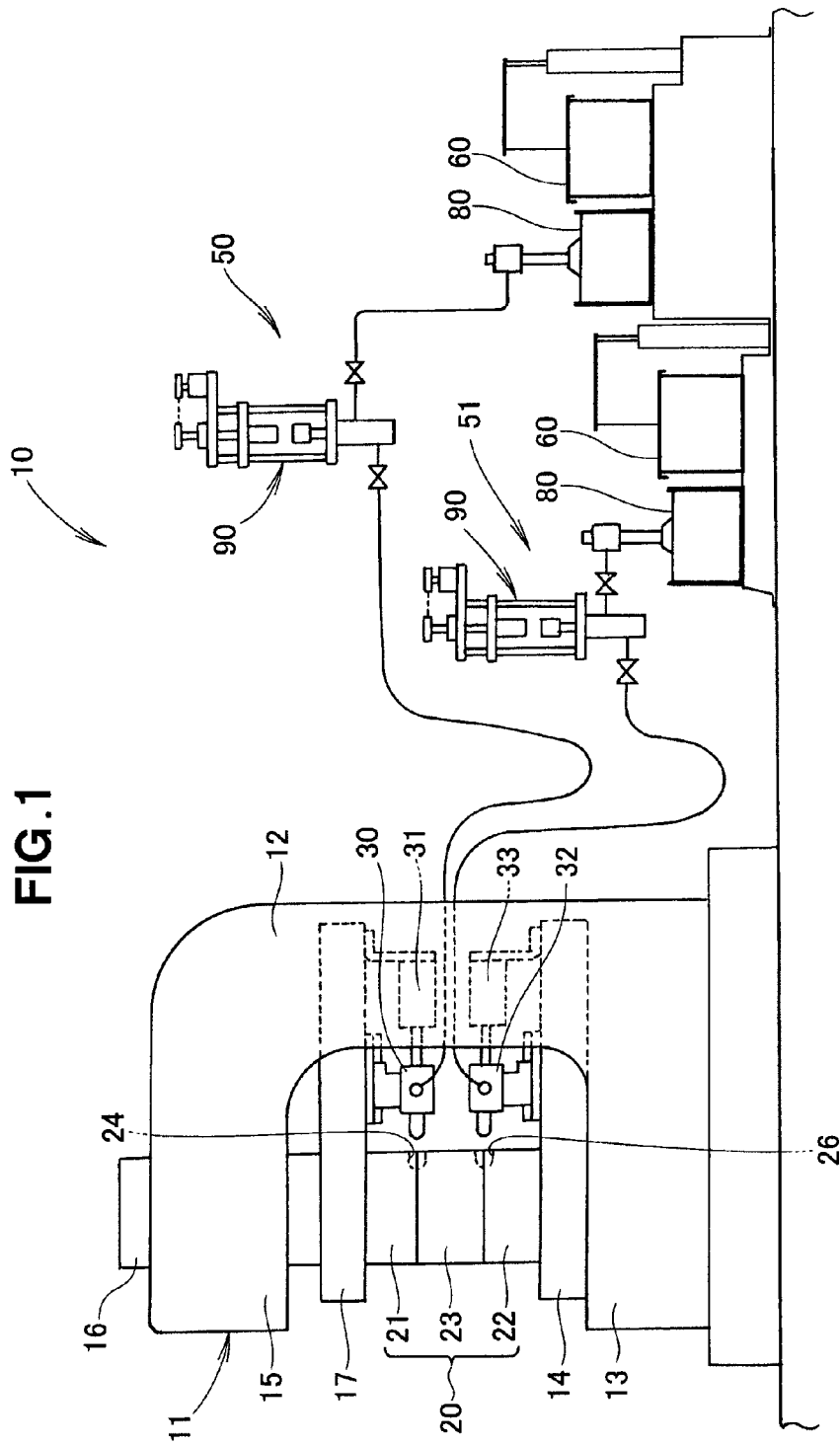
FIG. 1 is a schematic view of a liquid resin molding system according to the present invention.

Like reference numerals indicate the same or corresponding elements throughout the drawings.

As shown in FIG. 1, a liquid resin molding system 10 includes a vertical mold clamping mechanism 11, a mold 20 to be closed by the vertical mold clamping mechanism 11, and first and second injection nozzles 30, 32 for injecting a liquid resin into the mold 20. The liquid resin molding system 10 also includes first and second nozzle touch mechanisms 31, 33 for pressing each of the first and second injection nozzles 30, 32 against the mold 20, a first liquid resin feeding apparatus 50 disposed separately from the first injection nozzle 30 and the first nozzle touch mechanism 31 for feeding a liquid resin to the first injection nozzle 30, and a second liquid resin feeding apparatus 51 disposed separately from the second injection nozzle 32 and the second nozzle touch mechanism 33 for feeding a liquid resin to the second injection nozzle 32.

Figure 2:
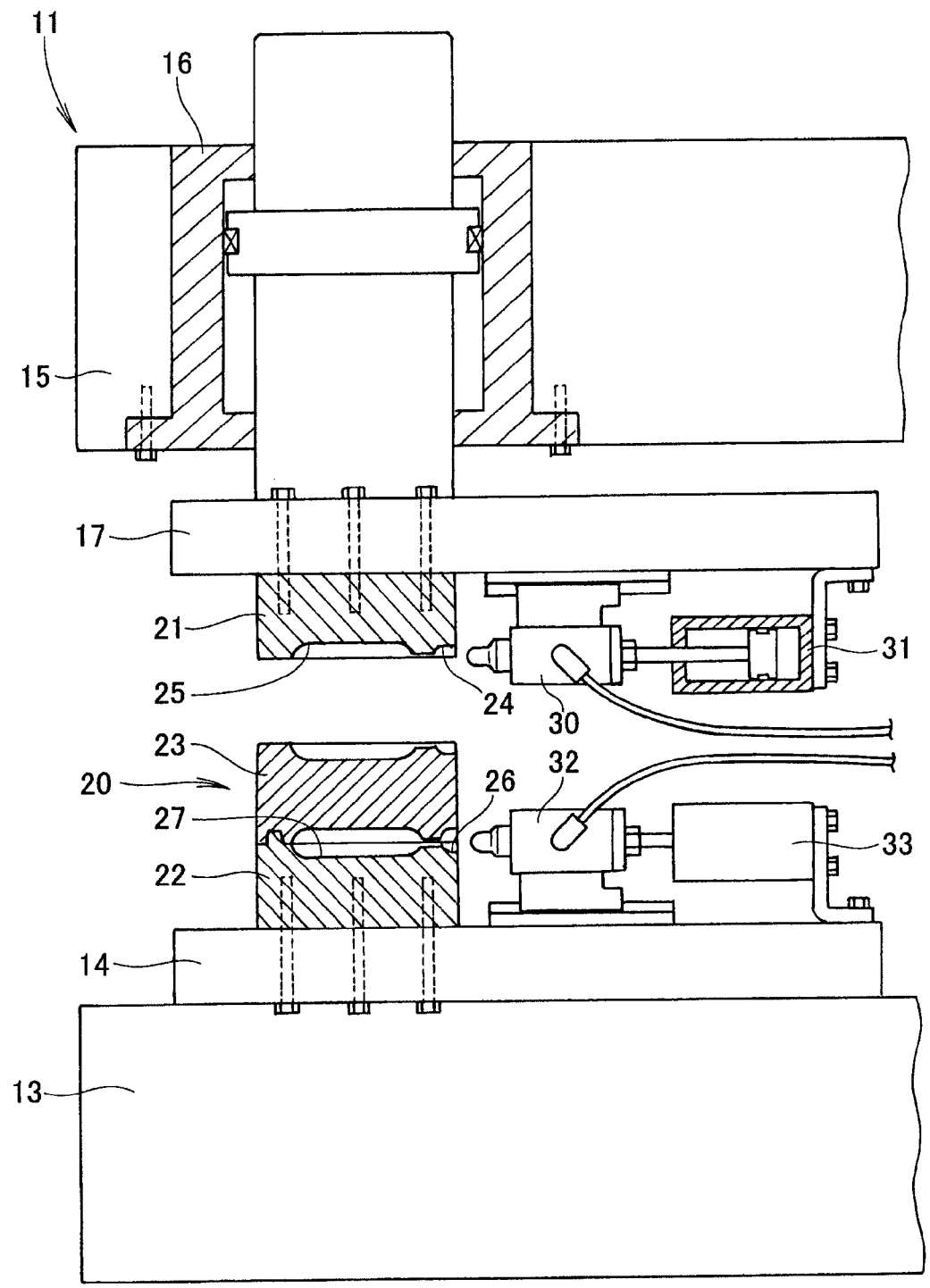
FIG. 2 is a partial cross-sectional view of a part of the liquid resin molding system.

As shown in FIG. 2, the vertical mold clamping mechanism 11 includes a C-shaped column 12 (FIG. 1), a stationary platen 14 fixed on a lower part 13 of the C-shaped column 12, a mold clamping cylinder 16 attached to an upper part 15 of the C-shaped column 12 and acting as mold clamping drive means for closing the mold 20, and a movable platen 17 attached to the mold clamping cylinder 16 and movable toward the stationary platen 14. It is to be noted that the mold clamping drive means should not be limited to the mold clamping cylinder 16 but may be a toggle link mechanism or a hydraulically or electrically driving source. Alternatively, the C-shaped column 12 may be turned upside down so that the cylinder 16 is attached to the lower part 13 and the stationary platen 14 is attached to the upper part 15 of the C-shaped column.

The mold 20 includes a first mold member 21 attached to the movable platen 17, a second mold member 22 attached to the stationary platen 14, and a third mold member 23 to be sandwiched between the second mold member 22 and the first mold member 21.

Attached to the movable platen 17 are the first injection nozzle 30 and the first nozzle touch mechanism 31. The first injection nozzle 30 is pushed by the first nozzle touch mechanism 31 into abutment on a first sprue 24.

The first mold member 21 and the third mold member 23 define a first cavity 25 therebetween. A liquid resin is fed through the first sprue 24 into the first cavity 25.

The second injection nozzle 32 and the second nozzle touch mechanism 33 are attached to the stationary platen 14. The second nozzle 32 is pushed by the second nozzle touch mechanism 33 into abutment on a second sprue 26.

The second mold member 22 and the third mold member 23 define a second cavity 27 therebetween. A liquid resin is fed through the second sprue 26 into the second cavity 27.

Figure 3:
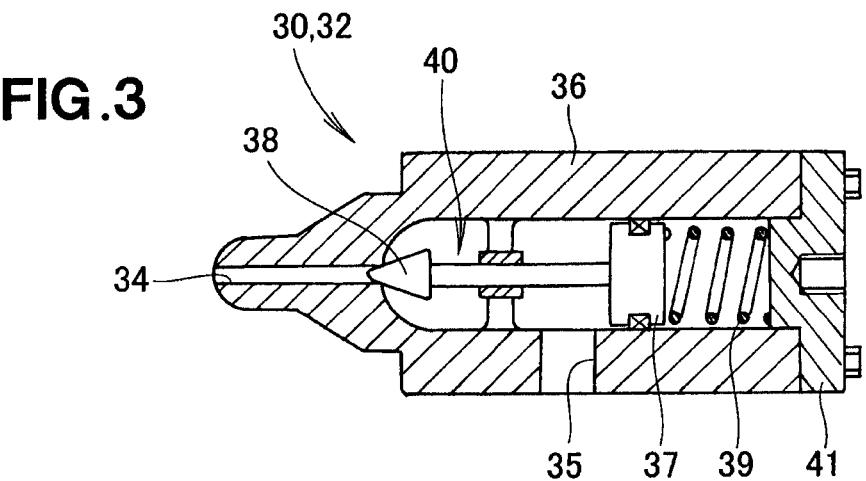
FIG. 3 is a cross-sectional view of an injection nozzle.

As shown in FIG. 3, each of the first injection nozzle 30 and the second injection nozzle 32 includes a tubular body 36 having a nozzle hole 34 formed through a tip thereof, and an introducing hole 35 formed through a lateral side thereof. Each injection nozzle is provided with a nozzle opening/closing mechanism 40 built therein. The nozzle opening/closing mechanism 40 includes a piston 37 movably fitted within the tubular body 36, a plug member 38 extending from the piston 37 for closing the nozzle hole 34, and a spring 39 forcing a back side of the piston 37. The tubular body 36 has an opening closed by a lid 41.

Figure 4:
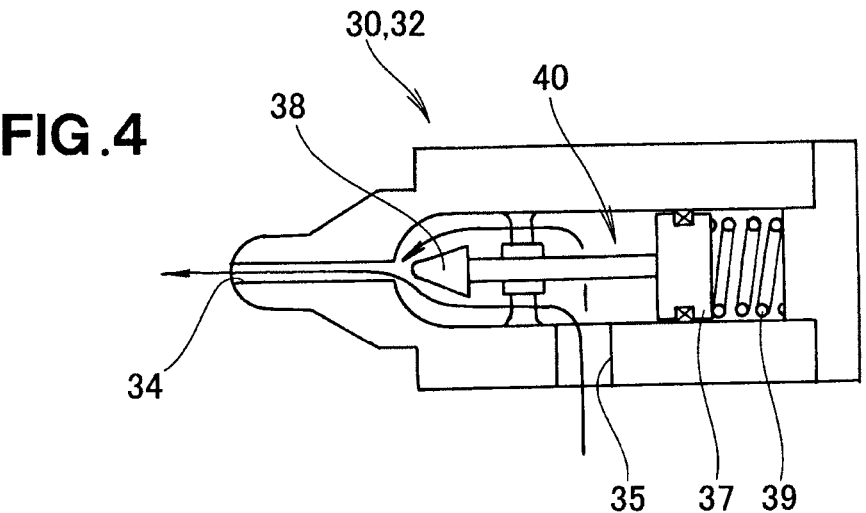
FIG. 4 is a view showing how the injection nozzle operates.

As shown in FIG. 4, when a liquid resin of high pressure exceeding a predetermined value is introduced through the introducing hole 35 into the tubular body 36, the spring 39 is compressed by the pressure of the liquid resin, thereby retracting the piston 37. This results in the plug member 38 moving away from the nozzle hole 34 to allow the liquid resin to be discharged out of the nozzle hole 34.

That is, the nozzle opening/closing mechanism 40 built in each of the first and second injection nozzles 30, 32 moves between a closed position to close the associated injection nozzle when a pressure of the liquid resin fed into the injection nozzle is less than the predetermined value, and an open position to open the injection nozzle when the pressure of the liquid resin exceeds the predetermined value. It is to be noted that the predetermined value is a value required in light of moldability and corresponding a pressure to inject (discharge) a liquid resin. The nozzle opening/closing mechanism 40 may be of cylinder type but is preferably of spring-type shown in FIG. 3 because the spring-type contributes to downsizing of the device.

Figure 5:
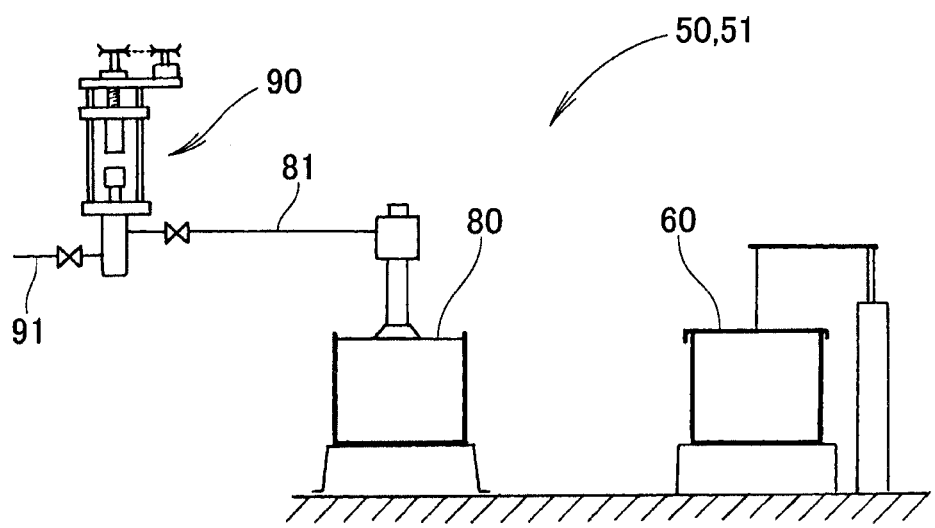
FIG. 5 is a schematic view of a liquid resin feeding apparatus.

As shown in FIG. 5, each of the first liquid resin feeding apparatus 50 and the second liquid resin feeding apparatus 51 includes a stirring/mixing mechanism 60 for sufficiently stirring a liquid resin, which is made of a main agent and an additive such as a curing agent added thereto, to mix the main agent and the additive together. The apparatus 50 also includes a pump mechanism 80 for pumping the stirred liquid resin, and a volumetric feeding mechanism 90 for measuring a quantity of the liquid resin pumped through a first flow passageway 81 from the pump mechanism 80 and for feeding a predetermined quantity of the liquid resin to the mold 20 through a second flow passageway 91 and the associated injection nozzle. It is to be noted that the stirring/mixing mechanism 60 and the pump mechanism 80 may be shared between the first and second liquid resin feeding apparatuses 50, 51.

Figure 6:
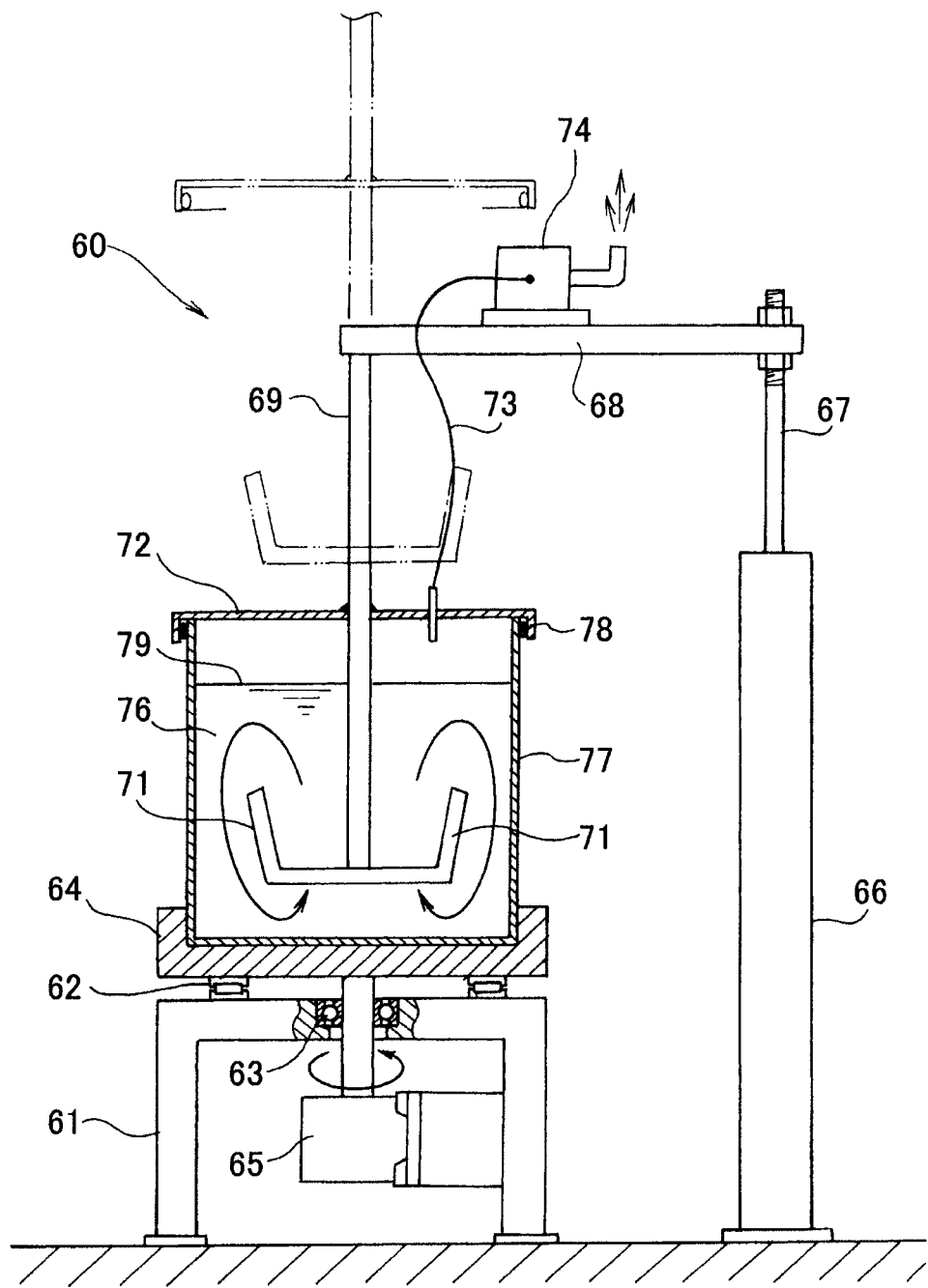
FIG. 6 is a schematic view of a stirring/mixing mechanism.

As shown in FIG. 6, the stirring/mixing mechanism 60 includes a base 61, a rotary table 64 rotatably attached to the base 61 through a thrust bearing 62 and a radial bearing 63, and a geared motor 65 attached to the base 61 for rotating the rotary table 64. The mechanism 60 also includes a cylinder 66 disposed laterally of the base 61, a horizontal bar 68 fixed to a piston rod 67 extending upward from the cylinder 66, and a rod 69 extending downward from one end of the horizontal bar 68. The mechanism 60 further includes an anchor-shaped stirring member fixed to a lower end of the rod 69 and having paddles 71, 71. The mechanism 60 further includes a lid 72 fixed on the rod 69, a flexible hose 73 extending from the lid 72, and a vacuum pump 74 connected to one end of the flexible hose 73. It is to be noted that the vacuum pump 74 may be set on any location other than the horizontal bar 68.

A vessel 77 holding a liquid resin 76 made of a main agent and an additive such as a curing agent added thereto is placed on the rotary table 64. Next, the rod 69 is moved down to submerge the paddles 71, 71 in the liquid resin 76, after which an upper opening of the vessel 77 is closed by the lid 72. The vessel 77 is tightly sealed by the lid 72 because the lid 72 is provided with a sealing material 78.

The rotary table 64 is rotated by the motor 65 at a speed in the order of one turn per second. Then, the vessel 77 is rotated relative to the paddles 71, 71 which remain stationary. Rotation of the vessel 77 swirls the liquid resin 76. At the same time, the vacuum pump 74 is actuated to provide inside of the vessel 77 with a negative pressure (a pressure below an atmospheric pressure).

The swirl of the liquid resin 76 relative to the rod 69 produces a vertical circulation of liquid resin as well as flow of liquid resin around the rod 69. Such a three-dimensional flow of liquid resin uniformly mixes the additive with the main agent. The vertical circulation forces bubbles in the liquid resin 76 to move upward to a liquid level 79. Air in the bubbles at the liquid level 79 is sucked upwardly to the vacuum pump 74 due to the negative pressure in a space between the liquid level 79 and the lid 72.

The stirring/mixing mechanism 60 is called a vacuum stirring mixer designed to apply a vacuum to remove bubbles from the liquid resin and stir the liquid resin to help mix the main agent and the additive together. After a stirring and mixing operation involving removal of bubbles from the liquid resin is completed, the vessel 77 is moved for a subsequent operation.

The vessel 77 moved from the stirring/mixing mechanism 60 is attached to the pump mechanism 80.

Figure 7:
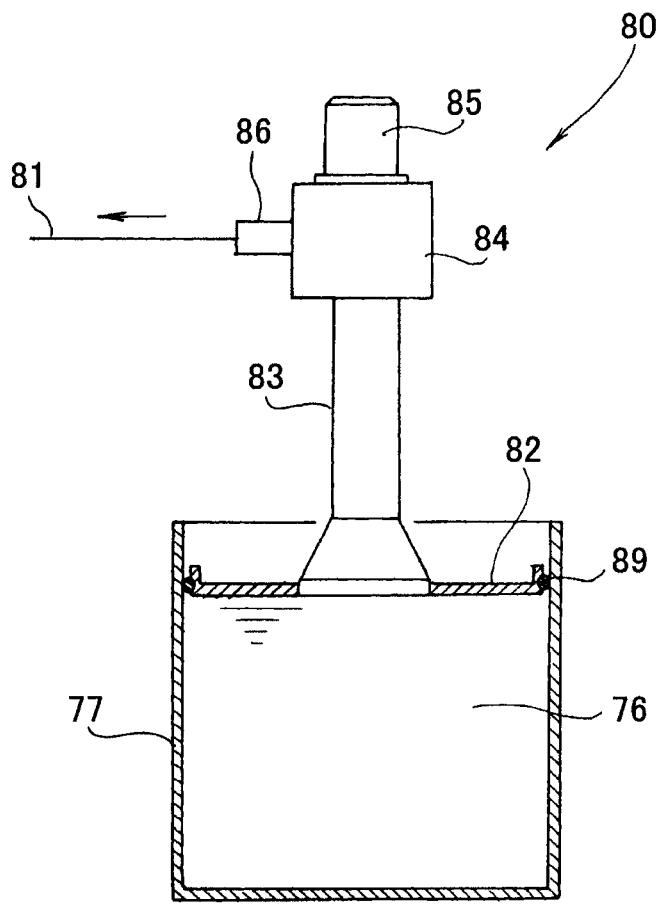
FIG. 7 is a schematic view of a pump mechanism.

As shown in FIG. 7, the pump mechanism 80 includes a disc-shaped lid 82, a sucking tube 83 rising from a center of the lid 82, and a pump casing 84 connected to an upper end of the sucking tube 83. The mechanism 80 also includes a pump motor 85 fixed on an upper surface of the pump casing 84 for quickly rotating pump vanes built in the pump casing 84, and a discharge tube 86 extending horizontally from the pump casing 84.

The vessel 77 holds the liquid resin 76 with the main agent and the additive sufficiently mixed with the main agent.

The lid 82 is inserted into the vessel 77 for placement onto the upper surface (liquid level) of the liquid resin 76. The lid 82 is provided with a sealing member 89 such as an O-ring for sealing engagement with an inner circumferential surface of the vessel 77. The pump motor 85 starts to discharge the liquid resin 76 out of the discharge tube 86. The discharge of the liquid resin from the discharge tube 86 lowers the liquid level of the liquid resin 76 as well as the lid 82, such that no ambient air enters below the lid 82. This prevents air from entering the liquid resin 76.

The liquid resin 76 pumped from the pump mechanism 80 is delivered through the first flow passageway 81 to the volumetric feeding mechanism 90.

Figure 8:
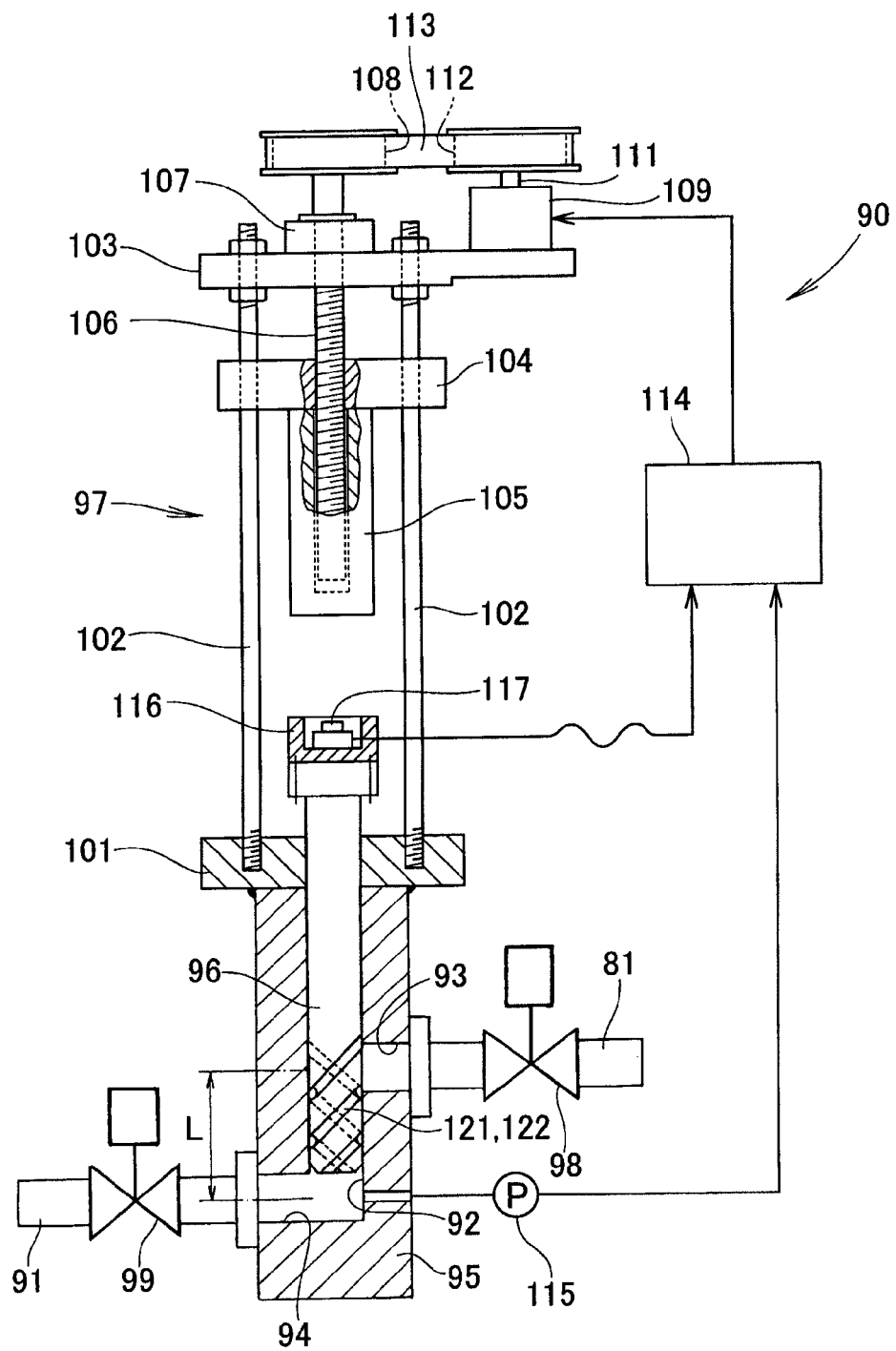
FIG. 8 is a schematic view of a volumetric feeding mechanism.

As shown in FIG. 8, the volumetric feeding mechanism 90 includes a body 95 including a pot portion 92 for storing the liquid resin, an inlet port 93 for introducing the liquid resin into the pot portion 92, and an outlet port 94 for discharging the liquid resin out of the pot portion 92. The volumetric feeding mechanism 90 also includes a plunger 96 movable attached to the body 95 in such a manner as to be retractable (movable upward in FIG. 8) under a pressure of the liquid resin stored in the pot portion 92. The volumetric feeding mechanism 90 further includes plunger pushing means 97 provided on the body 95 for pushing the plunger 96 toward an advanced position. In addition, the volumetric feeding mechanism 90 includes an ingress valve 98 disposed on the first flow passageway 81 for allowing or blocking a flow of the liquid resin, and an egress valve 99 disposed on the second flow passageway 91 for allowing or blocking a flow of the liquid resin.

The plunger pushing means 97 includes a bracket 101 disposed atop the body 95, and a plurality of rods 102 rising from the bracket 101. The plunger pushing means 97 also includes a top plate 103 fixed on top ends of the rods 102, a nut 104 disposed below the top plate 103 and arranged to be guided by the rods 102 to move up and down, and a piston rod 105 formed integrally with the nut 104. The plunger pushing means 97 further includes an upward extending feed screw 106 screwed into the nut 104, a thrust bearing 107 disposed on the top plate 103 and supports the feed screw 106 in such a manner as to allow rotation of the feed screw 106. In addition, the plunger pushing means 97 includes a driven pulley 108 disposed on a top end of the feed screw 106, a servo motor 109 disposed on the top plate 103, a driving pulley 112 attached to a motor shaft 111 of the servo motor 109, a belt 113 interconnecting the driving pulley 112 and the driven pulley 108, and a control unit 114 for controlling the servo motor 109.

Attached to the body 95 is a pressure gauge 115 for metering a pressure of the liquid resin near the outlet port 94. Fixed on a top end of the plunger 96 is a storage case 116 housing a proximity sensor 117 therein. The proximity sensor 117 is adapted to detect a contact between the piston rod 105 and the storage case 116.

The inlet port 93 is provided at a location offset a distance L from the outlet port 94 in an axial direction of the plunger 96 toward the plunger pushing means 97. The plunger 96 has a flow passage 121 for directing a liquid resin, fed from the inlet port 93, to a leading end of the plunger 96 even when the plunger 96 is in the most advanced position.

The flow passage 121 preferably has helical grooves 122 helically formed on an outer circumferential surface of the plunger 96.

The helical grooves 122 provides advantages that no force directed perpendicularly to an axis of the plunger 96 is applied to the plunger 96, and a sliding resistance between the plunger 96 and the body 95 can be reduced. Moreover, the helical grooves 122 provide a higher resistance than linear grooves, and reverse flow of a liquid resin can be prevented.

The volumetric feeding mechanism 90 functions as follows.

The piston rod 105 is set at a predetermined location, i.e., a measurement completed location. The plunger 96 is pushed up by a liquid resin to bring the storage case 116 into contact with the piston rod 105, and this contact is detected by the proximity sensor 117. This means that arrival of the plunger 96 at the predetermined location is detected. If there is concern on erroneous detection by the proximity sensor 117, a timer may be used with the proximity sensor 117, such that the timer is set to finish a time measurement when the contact between the plunger 96 and the piston rod 105 is made, while the proximity sensor 117 detects the contact. Alternatively, means for detecting a position of the plunger with high accuracy may be used in place of the proximity sensor 117. The detection of the contact between the plunger 96 and the piston rod 105 is judged to finish measuring a quantity of a liquid resin.

The ingress valve 98 is closed while the egress valve 99 is opened. The piston rod 105 is lowered by a predetermined first torque output from the servo motor 109. This advances the plunger 96 to feed the liquid resin through the second flow passageway 91 and the associated injection nozzle to the mold. During the feeding of the liquid resin, a pressure of the liquid resin is metered by the pressure gauge 115 and transmitted to the control unit 114.

The control unit 114 controls the servo motor 109 to cause the servo motor 109 to output a second torque less than the first torque, when the pressure of the liquid resin reaches a predetermined pressure. This control to change the first torque to the second torque is called a dwelling. Injection of the liquid resin into the cavity is completed when the plunger 96 moves to the most advanced position or when a given time to feed the most resin passes.

The liquid resin molding system operates as follow.

Turning to FIG. 2, the mold clamping cylinder 16 is actuated to lower the movable platen 17 to place the first mold member 21 onto the third mold member 23 in vertical alignment therewith.

Figure 9:
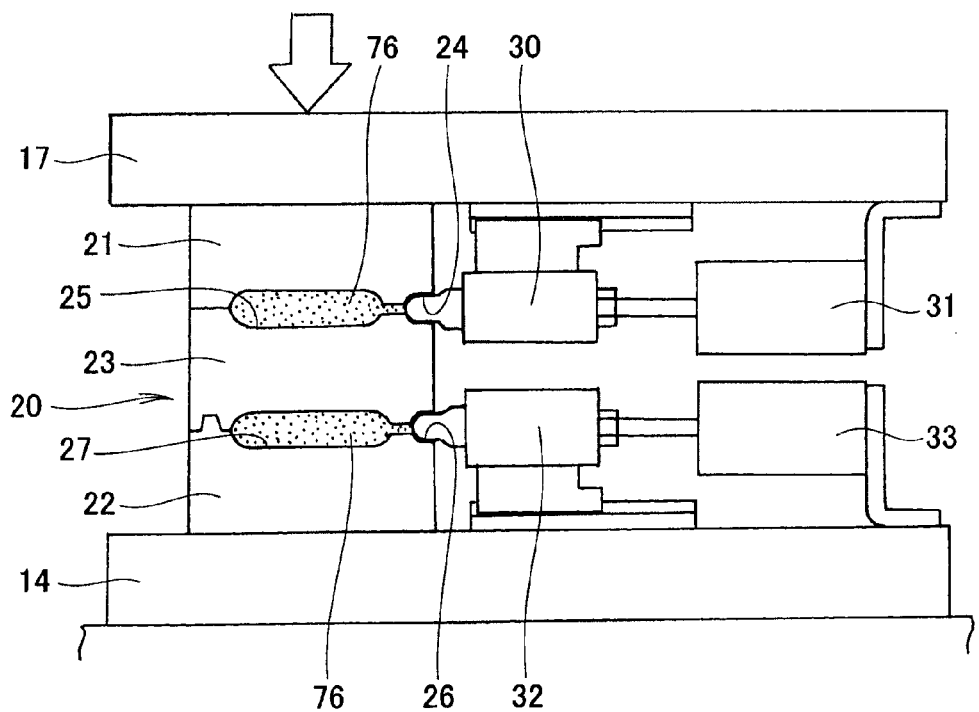
FIG. 9 is a view showing how the liquid resin molding system operates.

As shown in FIG. 9, the movable platen 17 is forced as indicated by an arrow to bring the mold 20 to the closed position. The first nozzle touch mechanism 31 is actuated to advance the first injection nozzle 30 to effect a "nozzle touch" of the first injection nozzle 30, that is, to urge the first injection nozzle 30 against the first sprue 24. Likewise, the second nozzle touch mechanism 33 is actuated to advance the second injection nozzle 32 to effect a "nozzle touch" of the second injection nozzle 32, that is, to urge the second injection nozzle 32 against the second sprue 26.

Subsequently, a liquid resin 76 is injected from the first injection nozzle 30 into the first cavity 25 while a liquid resin 76 is injected from the second injection nozzle 32 into the second cavity 27.

The liquid resin 76 is, for example a liquid silicone rubber. To form a molded product from the liquid silicone rubber in a short cycle, the mold is heated at a temperature, usually, in the range of 130 Celsius to 200 Celsius although an optimal temperature to heat the mold depends upon a thickness or shape of the molded product.

The heating of the mold causes the first mold member 21, the third mold member 23 and the second mold member 22 to thermally expand. This results in the first and second sprues 24, 26 shifting upward. More specifically, the first sprue 24 shifts relative to the stationary platen 14 by a distance which is in the order of twice a distance by which the second sprue 26 shifts relative to the stationary platen 14.

If the first injection nozzle 30 were attached to the stationary platen 14, the first injection nozzle 30 would disengage from the first sprue 24 and hence a significant leakage of liquid resin would occur.

As discussed above, however, the first injection nozzle 30 in the illustrated embodiment is attached to the movable platen 17 rather than to the stationary platen 14. The attachment of the first injection nozzle 30 to the movable platen 17 is advantageous because the first sprue 24 little shifts relative to the movable platen 17. That is, the first injection nozzle 30 can keep satisfactorily touching the first sprue 24, thereby preventing leakage of the liquid resin.

Since the first injection nozzle 30 and the first nozzle touch mechanism 31 are attached to the movable platen 17, the first injection nozzle 30 and the first mold member 21 moves together with the movable platen 17. This means that a position of the first mold member 21 relative to a position of the first injection nozzle 30 remains unchanged and therefore, there is no concern on leakage of the liquid resin.

The second injection nozzle 32 is attached to the stationary platen 14. The second sprue 26 little shifts relative to the stationary platen 14. The second injection nozzle 32 keeps satisfactorily touching the second sprue 24, thereby preventing leakage of the liquid resin.

A modified liquid resin molding system 10 will be discussed hereinbelow with reference to FIG. 10 to FIG. 12C.

The modified system 10 shown in FIG. 10 to FIG. 12C has a single injection nozzle which is hereinafter referred to as "injection nozzle 30".

Figure 10:
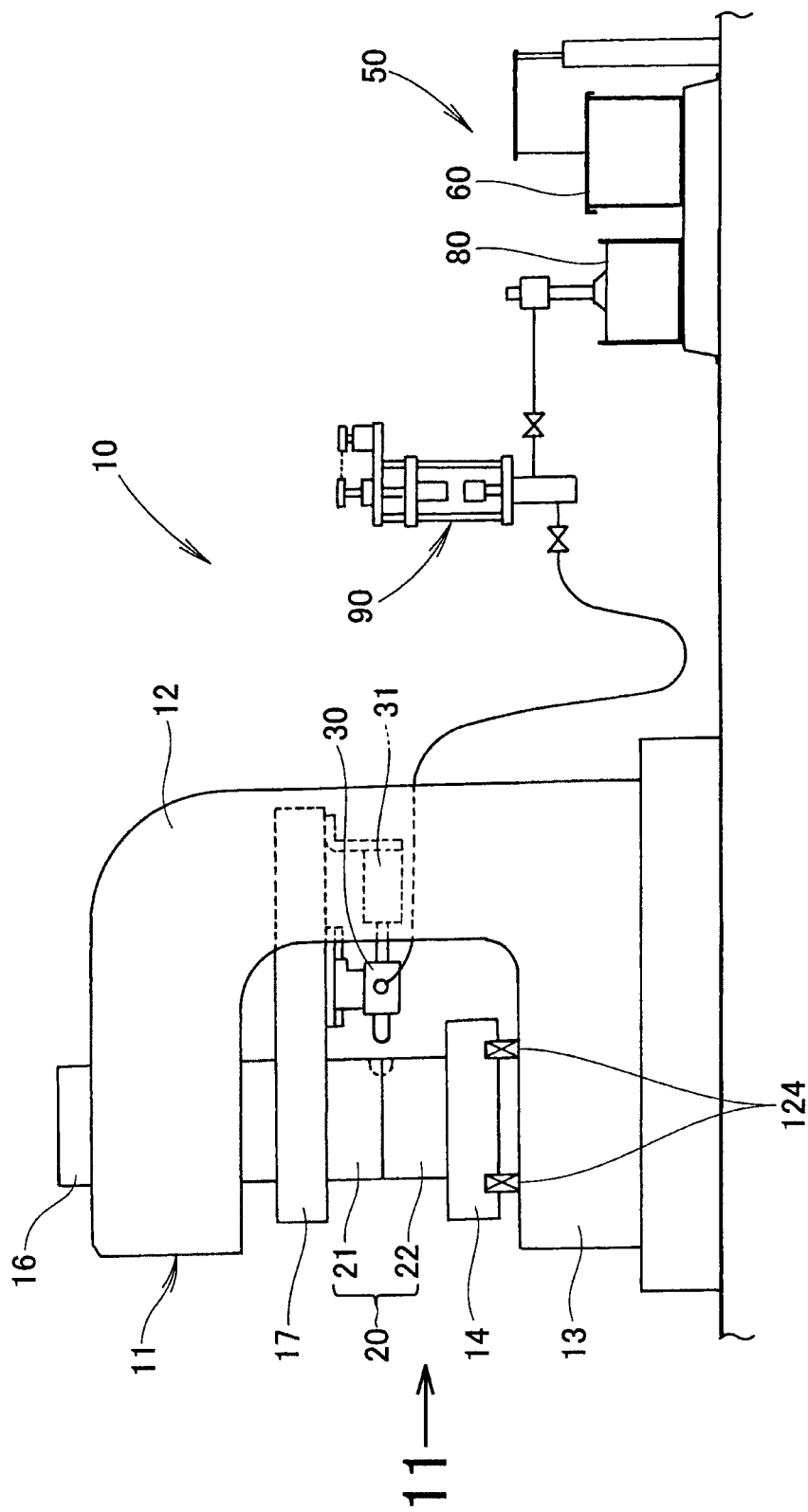
FIG. 10 is a schematic view of a modified liquid resin molding system according to the present invention.

As shown in FIG. 10, the modified system 10 includes a vertical mold clamping mechanism 11. The vertical mold clamping mechanism 11 includes a stationary platen 14, a movable platen 17 movable relative to the stationary platen 14, and a mold clamping cylinder 16 for moving the movable platen 17 vertically. The modified system 10 also includes a mold 20 to be closed by the vertical mold clamping mechanism 11. The mold 20 includes a first mold member 21 attached to the movable platen 17 and a second mold member 22 attached to the stationary platen 14. The modified system 10 further includes the injection nozzle 30 for injecting a liquid resin into a cavity defined within the mold 20, a nozzle touch mechanism 31 for pressing the injection nozzle 30 against the mold 20, and a liquid resin feeding apparatus 50 disposed separately from the injection nozzle 30 for feeding a liquid resin 76 into the injection nozzle 30. The injection nozzle 30 and the nozzle touch mechanism 31 are attached to the movable platen 17.

Figure 11:
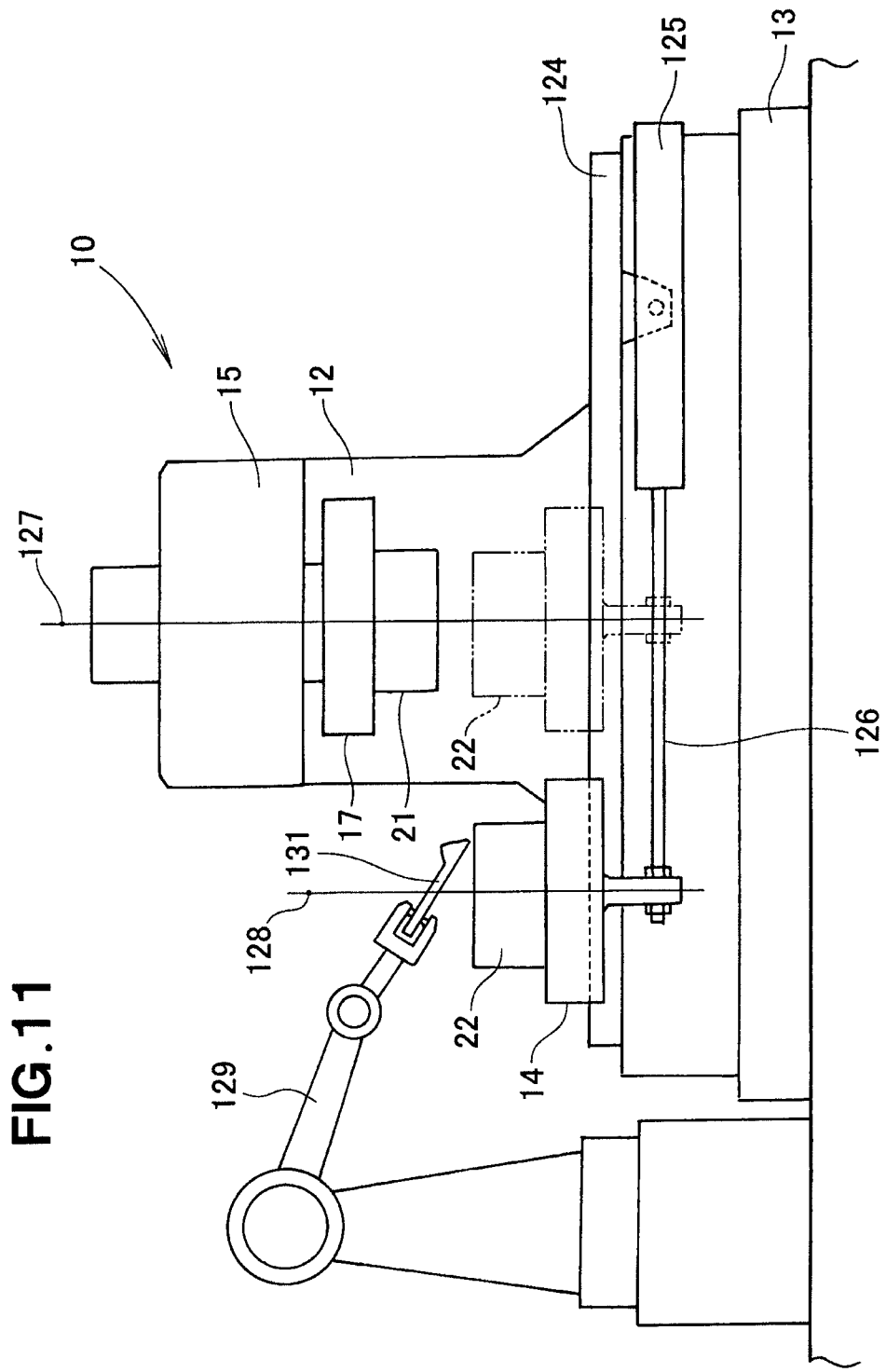
FIG. 11 is a view taken in a direction of an arrow of FIG. 10.
Figure 12:
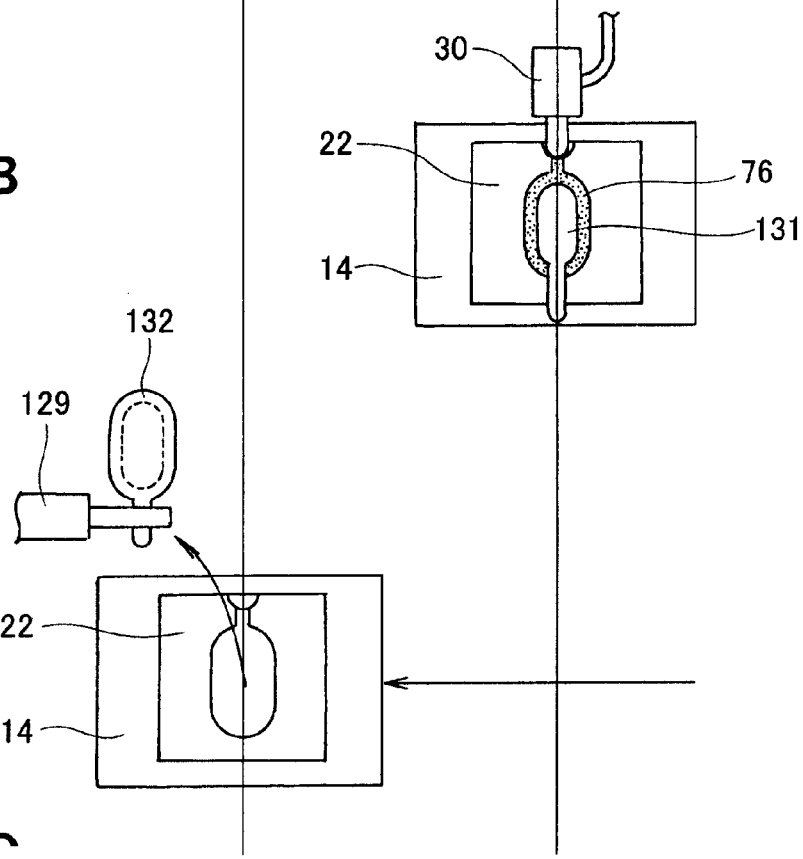
FIGS. 12A to 12C show how the modified liquid resin molding system operates.

As shown in FIG. 11, the lower part 13 of the C-shaped column 12 is a horizontally extending bed provided with a slide mechanism for allowing the stationary platen 14 to slide on the slide mechanism. More specifically, the slide mechanism includes a rail 124 lying on the bed 13. On the rail 124, the stationary platen 14 is horizontally movably carried. The slide mechanism further includes a cylinder unit 125 attached to the bed 13 and having a piston rod 126 connected to the stationary platen 14.

The stationary platen 14 is slid along the rail 124 by the cylinder unit 125 in such a manner as to shuttle between a first position 127 directly below the movable platen 17 and a second position 128 horizontally offset from the movable platen 17. The first position 127 is a "molding position" in which a molded product is formed from a liquid resin. The second position is a "removing position" in which the molded product is removed from the second mold member 22. Proximate the removing position 128 is disposed a robot 129 acting as a removing mechanism for setting an insert 131 on the second mold member 22 held in the removing position 128 and for removing the resultant insert-molded product from the second mold member 22.

As shown in FIG. 12A, an insert 131 is set on the second mold member 22 held in the removing position 128. Thereafter, the second mold member 22 is shifted to the molding position 127, as shown by an arrow.

As shown in FIG. 12B, a liquid resin 76 is injected from the injection nozzle 30 into the cavity in the mold with the second mold member 22 in the molding position 127.

As shown in FIG. 12C, the second mold member 22 is shifted to the removing position 128 to allow the robot 129 to remove an insert-molded product 132.

The removal of the insert-molded product 132 can be easily effected because the insert-molded product 132 is removed in the removing position 128 different from the molding position 127. This enhances productivity of insert-molded products.

A further modified liquid resin molding system 10 is discussed hereinbelow with reference to FIG. 13 to FIG. 14D.

Figure 13:
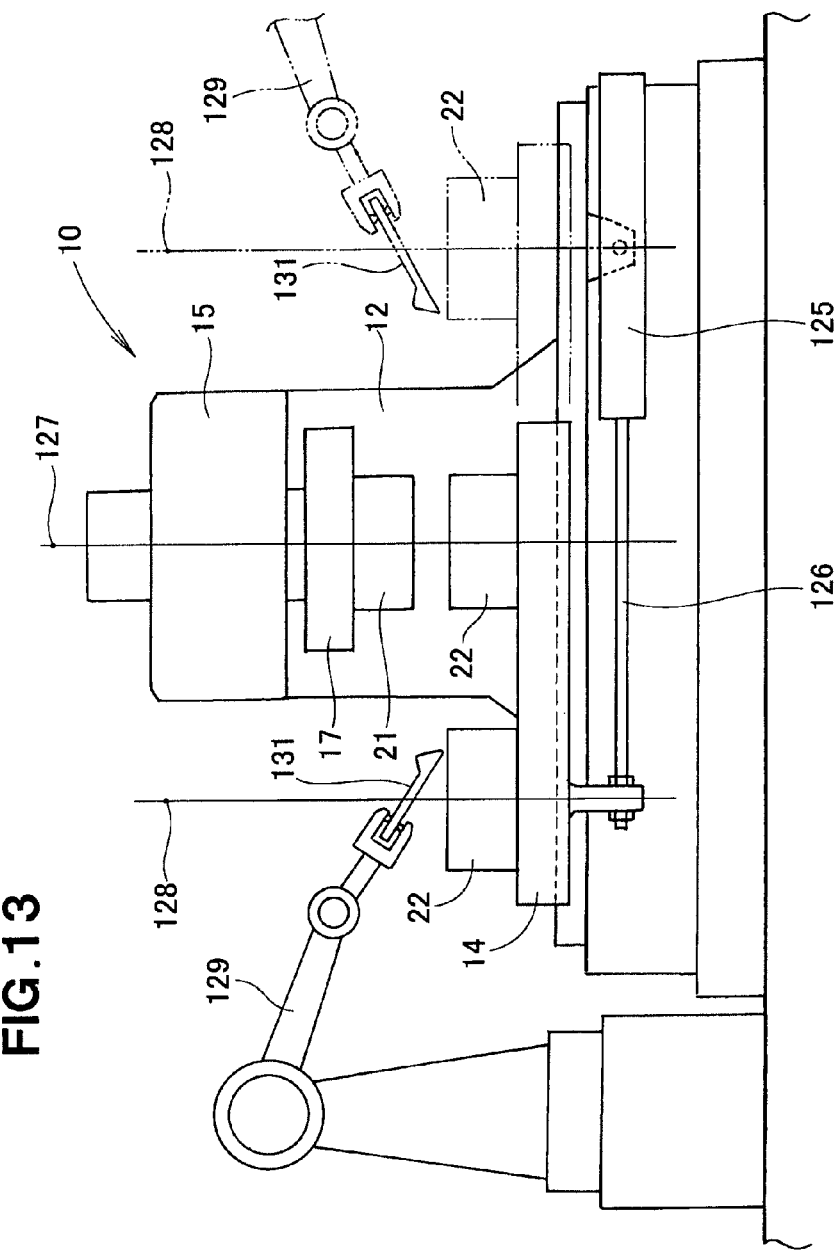
FIG. 13 is a schematic view of a further modified liquid resin molding system according to the present invention.
Figure 15A:
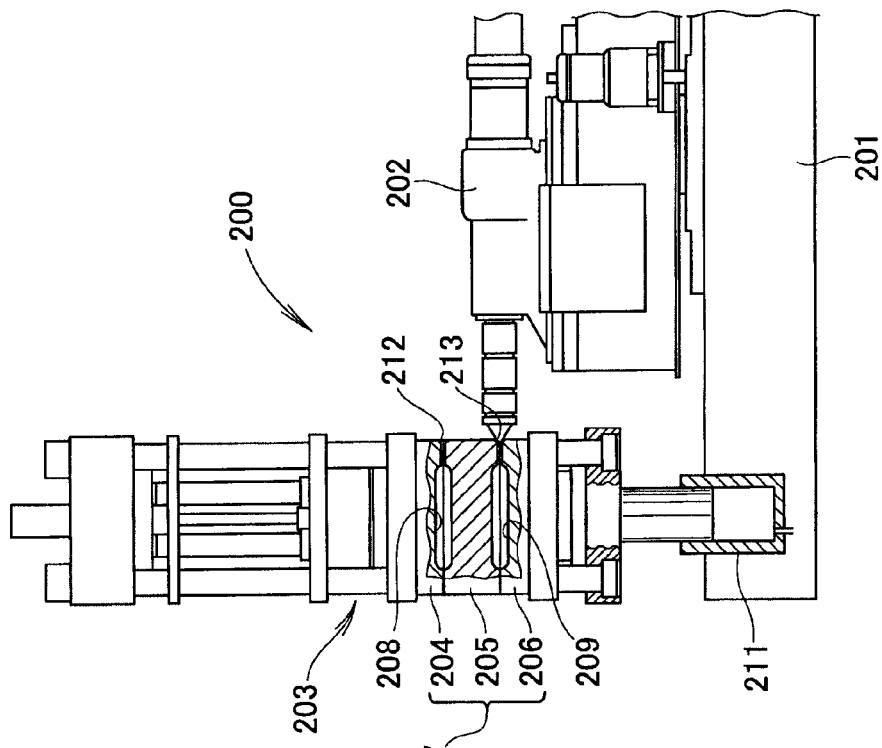
FIGS. 15A and 15B are schematic views of prior art injection molding apparatuses.
Figure 15B:
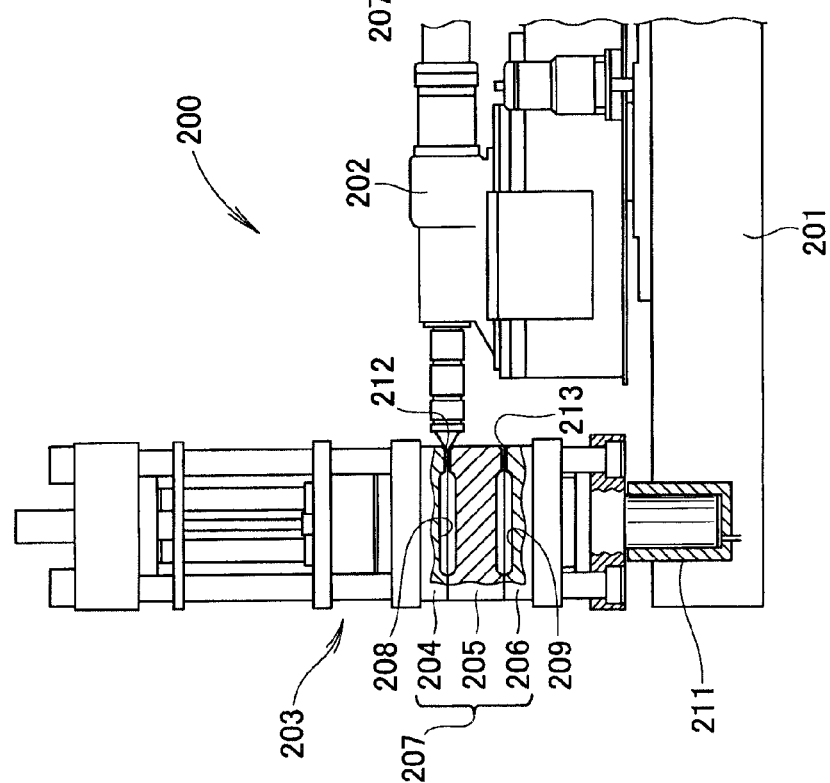

As shown in FIG. 13, the further modified system 10 has two second mold members 22, 22 carried on the stationary platen 14 and slidable in the same manner as the stationary platen 14 of the modified system 10 shown in FIGS. 10 to 12C, such that the stationary platen 14 moves between a central molding position 127 and each of removing positions 128, 128 located on opposite sides of the central molding position 127. The further modified system 10 also has robots 129, 129 disposed proximate each of the removing positions 128, 128.

As shown in FIG. 14A, an insert 131 is set on the left second mold member 22 and the stationary platen 14 is shifted as shown by an arrow.

As shown in FIG. 14B, a liquid resin 76 is injected by the injection nozzle 30 into the left second mold member 22 while an insert 131 is set on the right second mold member 22.

As shown in FIG. 14C, the left second mold member 22 is shifted to the left removing position 128 to allow the left robot 129 to remove an insert-molded product 132 from the left second mold member 22. Concurrently, a liquid resin 76 is injected by the injection nozzle 30 into the right second mold member 22.

As shown in FIG. 14D, the right robot 129 removes an insert-molded product 132 from the right second mold member 22 while a liquid resin 76 is injected by the injection nozzle 30 into the left second mold member 22.

Since the two second mold members 22, 22 are carried on the stationary platen 14, as shown in FIG. 13, productivity can be doubled in spite of use of the single first mold member 21 and the single injection nozzle 14 if operating rates of the first mold member 21 and the injection nozzle 30 are doubled.

The present invention is preferably used as equipment for producing a molded product by injecting a liquid resin into a mold.

Obviously, various minor changes and modifications of the present invention are possible in the light of the above teaching. It is therefore to be understood that within the scope of the appended claims the invention may be practiced otherwise than as specifically described.

What is claimed is:

1. A liquid resin molding system comprising:
   a vertical mold clamping mechanism including a stationary platen, a movable platen movable relative to the stationary platen, and mold clamping drive means for moving the movable platen vertically;
   a mold to be closed by the vertical mold clamping mechanism, the mold including two mold members defining a cavity therebetween and a sprue in communication with the cavity, one of the mold members being attached to a portion of the movable platen and the other of the mold members being attached to the stationary platen;
   an injection nozzle for injecting through a nozzle opening thereof a liquid resin into the mold cavity through the sprue;
   a nozzle touch mechanism for pressing the injection nozzle against the mold; and
   a liquid resin feeding apparatus disposed separately from the injection nozzle and the mold for feeding the liquid resin to the injection nozzle,
   wherein the injection nozzle and the nozzle touch mechanism are attached to portions of the movable platen different from the portion thereof to which the one mold member is attached so that the nozzle opening of the injection nozzle confronts the sprue.

2. The system according to claim 1, further comprising a nozzle opening/closing mechanism built in the injection nozzle for closing the injection nozzle when a pressure of the liquid resin fed to the injection nozzle is equal to or less than a predetermined value, and for opening the injection nozzle when the pressure exceeds the predetermined value.

3. The system of claim 1, wherein the liquid resin is made of a main agent and an additive added to the main agent, and wherein the liquid resin feeding apparatus comprises:
   a stirring/mixing mechanism for stirring the liquid resin to mix the main agent and the additive together;
   a pump mechanism for pumping the stirred liquid resin made of the main agent and the additive mixed with the main agent and
   a volumetric feeding mechanism for measuring a quantity of the liquid resin pumped from the pump mechanism and intermittently feeding a predetermined quantity of liquid resin to the injection nozzle.

4. The system of claim 3, wherein the additive is a curing agent.

5. The system of claim 3, further comprising:
a first flow passageway interconnecting the pump mechanism and the volumetric feeding mechanism;
a second flow passageway interconnecting the volumetric feeding mechanism and the injection nozzle, wherein the volumetric feeding mechanism comprises:
a body including a pot portion for storing the liquid resin pumped through the first flow passageway from the pump mechanism, an inlet port connected to the first flow passageway for introducing the liquid resin into the pot portion, and an outlet port connected to the second flow passageway for discharging the liquid resin out of the pot portion;
a plunger movably attached to the body;
plunger pushing means provided on the body for pushing the plunger toward an advanced position;
an ingress valve disposed on the first flow passageway for moving between an open position to open the first flow passageway and a closed position to close the first flow passageway; and
an egress valve disposed on the second flow passageway for moving between an open position to open the second flow passageway and a closed position to close the second flow passageway.

6. The system of claim 1, further comprising a slide mechanism for allowing the stationary platen to horizontally slide on the slide mechanism in such a manner as to shuttle between a molding position in which a molded product is formed from the liquid resin and a removing position in which the molded product is removed from the other mold member.

7. The system of claim 6, further comprising a removing mechanism disposed in the removing position for setting an insert on the other mold member and removing an insert-molded product from the other mold member.

8. The system of claim 6, further comprising a third mold member attached to the stationary platen, and wherein the removing position comprises two removing positions located on each of opposite sides of the mold.

9. The system according to claim 8, further comprising a removing mechanism disposed in each of the removing positions for setting an insert on each of the other mold member and the third mold member and for removing an insert-molded product from each of the other mold member and the third mold member.

10. A liquid resin molding system comprising:
a vertical mold clamping mechanism including a stationary platen, a movable platen movable relative to the stationary platen, and mold clamping drive means for moving the movable platen vertically;
a mold to be closed by the vertical mold clamping mechanism, the mold including a first mold member attached to a portion of the movable platen, a second mold member attached to a portion of the stationary platen, a third mold member sandwiched between the first mold member and the second mold member, a first cavity defined between the first mold member and the third mold member, a first sprue in communication with the first cavity, a second cavity defined between the second mold member and the third mold member, and a second sprue in communication with the second cavity;
a first injection nozzle for injecting through a nozzle opening thereof a liquid resin into the first cavity through the first sprue of the mold;
a first nozzle touch mechanism for pressing the first injection nozzle against the mold;
a first liquid resin feeding apparatus disposed separately from the first injection nozzle and the mold for feeding the liquid resin to the first injection nozzle;
a second injection nozzle for injecting through a nozzle opening thereof a liquid resin into the second cavity through the first sprue of the mold;
a second nozzle touch mechanism for pressing the second injection nozzle against the mold; and
a second liquid resin feeding apparatus disposed separately from the second injection nozzle and the mold for feeding the liquid resin to the second injection nozzle,
wherein the first injection nozzle and the first nozzle touch mechanism are attached to portions of the movable platen different from the portion thereof to which the first mold member is attached so that the nozzle opening of the first injection nozzle confronts the first sprue, and
wherein the second injection nozzle and the second nozzle touch mechanism are attached to the stationary platen.

11. The system of claim 10, further comprising nozzle opening/closing mechanisms built in the first and second injection nozzles for closing the first and second injection nozzles when a pressure of the liquid resin fed to each of the first and second injection nozzles is equal to or less than a predetermined value, and for opening the first and second injection nozzles when the pressure exceeds the predetermined value.

12. The system of claim 10, wherein the liquid resin is made of a main agent and an additive added to the main agent, and wherein each of the first and second liquid resin feeding apparatuses comprises:
a stirring/mixing mechanism for stirring the liquid resin to mix the main agent and the additive together;
a pump mechanism for pumping the stirred liquid resin made of the main agent and the additive mixed with the main agent; and
a volumetric feeding mechanism for measuring an quantity of the liquid resin pumped from the pump mechanism and intermittently feeding a predetermined quantity of liquid resin to each of the first and second injection nozzles.

13. The system of claim 12, wherein the additive is a curing agent.

14. The system of claim 12, further comprising:
a first flow passageway interconnecting the pump mechanism and the volumetric feeding mechanism;
a second flow passageway interconnecting the volumetric feeding mechanism and each of the first and second injection nozzles,
wherein the volumetric feeding mechanism comprises:
a body including a pot portion for storing the liquid resin pumped through the first flow passageway from the pump mechanism, an inlet port connected to the first flow passageway for introducing the liquid resin into the pot portion, and an outlet port connected to the second flow passageway for discharging the liquid resin out of the pot portion;
a plunger movably attached to the body;
plunger pushing means provided on the body for pushing the plunger toward an advanced position;
an ingress valve disposed on the first flow passageway for moving between an open position to open the first flow passageway and a closed position to close the first flow passageway; and
an egress valve disposed on the second flow passageway for movement between an open position to open the second flow passageway and a closed position to close the second flow passageway.

15. A liquid resin molding system comprising:
a stationary platen;
a movable platen mounted for undergoing movement relative to the stationary platen;
a mold having at least one cavity and a sprue communicating with the mold cavity and comprising a first mold member attached to a portion of the movable platen and a second mold member attached to the stationary platen;
an injection nozzle configured to receive a liquid resin and to inject through a nozzle opening thereof the liquid resin into the mold cavity through the sprue of the mold, the injection nozzle being attached to a portion of the movable platen different from the portion thereof to which the mold is attached so that the nozzle opening of the injection nozzle confronts the sprue;
a nozzle touch mechanism attached to the movable platen for pressing the injection nozzle against the mold; and
a liquid resin feeding apparatus disposed separately from the injection nozzle and the mold for feeding the liquid resin to the injection nozzle.

\* \* \* \* \*